US010181090B2

(12) United States Patent
Chu et al.

(10) Patent No.: US 10,181,090 B2
(45) Date of Patent: Jan. 15, 2019

(54) SECURE AND PRIVATE TRACKING ACROSS MULTIPLE CAMERAS

(71) Applicant: Microsoft Technology Licensing, LLC, Redmond, WA (US)

(72) Inventors: Chun-Te Chu, Bellevue, WA (US); Jaeyeon Jung, Kirkland, WA (US); Zicheng Liu, Bellevue, WA (US); Ratul Mahajan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/958,820

(22) Filed: Apr. 20, 2018

(65) Prior Publication Data

US 2018/0239985 A1    Aug. 23, 2018

Related U.S. Application Data

(63) Continuation of application No. 14/693,791, filed on Apr. 22, 2015, now Pat. No. 9,977,991, which is a continuation of application No. 13/731,822, filed on Dec. 31, 2012, now abandoned.

(51) Int. Cl.
| | |
|---|---|
| *G06K 9/00* | (2006.01) |
| *G06K 9/52* | (2006.01) |
| *G06K 9/62* | (2006.01) |
| *H04N 7/18* | (2006.01) |
| *G06F 17/30* | (2006.01) |
| *G06T 7/292* | (2017.01) |

(52) U.S. Cl.
CPC ....... *G06K 9/6201* (2013.01); *G06F 17/3028* (2013.01); *G06K 9/00711* (2013.01); *G06K 9/52* (2013.01); *G06T 7/292* (2017.01); *H04N 7/181* (2013.01); *G06T 2207/10016* (2013.01); *G06T 2207/10024* (2013.01); *G06T 2207/20036* (2013.01); *G06T 2207/20081* (2013.01); *G06T 2207/20224* (2013.01); *G06T 2207/30232* (2013.01)

(58) Field of Classification Search
CPC .................................................... G06K 9/6201
USPC ........................................................ 348/159
See application file for complete search history.

(56) References Cited

U.S. PATENT DOCUMENTS

| | | | | |
|---|---|---|---|---|
| 5,715,325 | A * | 2/1998 | Bang ................. | G06K 9/00228 382/118 |
| 6,807,360 | B1 * | 10/2004 | Imai ...................... | H04N 7/181 348/143 |
| 7,720,261 | B2 * | 5/2010 | Hiraizumi .......... | G06K 9/00308 348/208.14 |
| 8,224,088 | B2 * | 7/2012 | Itoh .................... | G06K 9/00785 348/170 |

(Continued)

*Primary Examiner* — Leron Beck
(74) *Attorney, Agent, or Firm* — Drinker Biddle & Reath LLP

(57) ABSTRACT

A technique for multi-camera object tracking is disclosed that preserves privacy of imagery from each camera or group of cameras. This technique uses secure multi-party computation to compute a distance metric across data from multiple cameras without revealing any information to operators of the cameras except whether or not an object was observed by both cameras. This is achieved by a distance metric learning technique that reduces the computing complexity of secure computation while maintaining object identification accuracy.

20 Claims, 10 Drawing Sheets

(56) References Cited

U.S. PATENT DOCUMENTS

| | | | |
|---|---|---|---|
| 8,370,421 B2* | 2/2013 | Gennari | G08B 13/19645 348/143 |
| 9,077,539 B2* | 7/2015 | Kamara | H04L 9/3218 |
| 9,124,417 B2* | 9/2015 | Kolesnikov | H04L 9/06 |
| 9,141,184 B2* | 9/2015 | Uchikoshi | G06F 3/005 |
| 2003/0167402 A1* | 9/2003 | Stolfo | H04L 51/12 726/23 |
| 2005/0073585 A1* | 4/2005 | Ettinger | H04N 7/18 348/155 |
| 2005/0149516 A1* | 7/2005 | Wolf | G06F 17/30 |
| 2006/0212337 A1* | 9/2006 | Vayghan | G06Q 10/063112 705/7.14 |
| 2006/0217892 A1* | 9/2006 | Heilper | G06F 19/22 702/19 |
| 2007/0039030 A1* | 2/2007 | Romanowich | G08B 13/19608 725/105 |
| 2008/0021899 A1* | 1/2008 | Avidan | G06K 9/6276 |
| 2009/0154795 A1* | 6/2009 | Tan | G06F 17/30247 382/155 |
| 2012/0319724 A1* | 12/2012 | Plusquellic | H04L 9/0861 326/8 |
| 2013/0035979 A1* | 2/2013 | Tenbrock | G06Q 30/02 705/7.29 |

\* cited by examiner

SECURE AND PRIVATE TRACKING ACROSS MULTIPLE CAMERAS

CROSS REFERENCE TO RELATED APPLICATION

This application is a continuation of U.S. patent application Ser. No. 14/693,791, filed Apr. 22, 2015, now granted as U.S. Pat. No. 9,997,991, which is a continuation application of U.S. patent application Ser. No. 13/731,822 filed Dec. 31, 2012 (now abandoned), entitled "Secure and Private Tracking Across Multiple Cameras". The contents of each of these applications are incorporated by reference herein in their entirety.

BACKGROUND

Camera-based surveillance is widely employed to detect against crime such as burglaries and vandalism. Recently, the commoditization of video cameras and the advances in computer vision have lowered the barrier of deploying a small-scale camera-based surveillance system. These small-scale systems may be sufficient for recording activities in the immediate area, but some activities do not appear suspicious until data from multiple cameras is analyzed in aggregate. These types of activities include strangers knocking on several doors in a neighborhood (i.e., to figure out which houses are empty) and cars cruising the neighborhood without stopping anywhere (i.e., as part of reconnaissance prior to a burglary).

If users of the small-scale systems shared data with each other, or with a third party such as law enforcement or a monitoring company, many more suspicious activities could be detected than if each user merely viewed his or her own video cameras. However, residents and businesses may be reluctant to share data from their respective video cameras due to privacy concerns. Thus, the ability to detect suspicious activity by making inferences across data received from multiple cameras deployed by multiple different users is hindered by the respective users' reluctance to sacrifice privacy by sharing their video with others.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure presents a distributed surveillance technique that can track objects (e.g., humans, cars, etc.) across multiple cameras without sharing information about the objects other than the existence or absence of a match between two objects. Objects are identified in video feeds captured by video cameras and represented mathematically by generating feature vectors from the objects. A distance metric learning approach is used to compare the distance between two feature vectors and determine if vectors are similar enough to each other to conclude that the corresponding objects are actually two different videos of the same object. Since the creation of feature vectors is not limited to objects captured in video this technique is equally applicable in other fields that include data which can be reduced to a vector representation.

A distance function used to calculate the similarity between two vectors is decomposed into portions that are computed locally and portions that are computed jointly. Computing systems associated with the respective cameras may solve the local portions of the distance function without privacy concerns. Therefore, computationally intensive encryption is not needed to solve the local portions of the distance function. However, the joint portions of the distance function use data obtained from multiple cameras which can raises privacy concerns. Cryptographic operations are used to preserve privacy when solving the joint portion of the distance function so this part of the distance function imposes a higher processing burden on the associated computing systems.

The joint portion of the distance function uses a garbled circuit based secure multi-party computation to keep both participants' contributions (i.e., data derived from solving the local portions of the distance algorithm) hidden from each other. The function may be represented as a Boolean circuit which is constructed of various logic gates. The type of and number of logic gates is an indication of the complexity, and thus the computer processing needed, to solve the function. The joint portion of the distance function is constructed as an efficient Boolean circuit that uses a number and type of logic gates which allows for solving of the joint portion of the distance function with a relatively low computational burden while still maintaining privacy and preserving matching accuracy.

Thus, the approach of decomposing a distance function into local portions and joint portions as well as the design of the Boolean circuit provide a computationally efficient and privacy-preserving technique for comparing feature vectors. This technique may be use to track an object across multiple cameras without sharing private information between the cameras.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Illustrative Architecture

Figure 1:
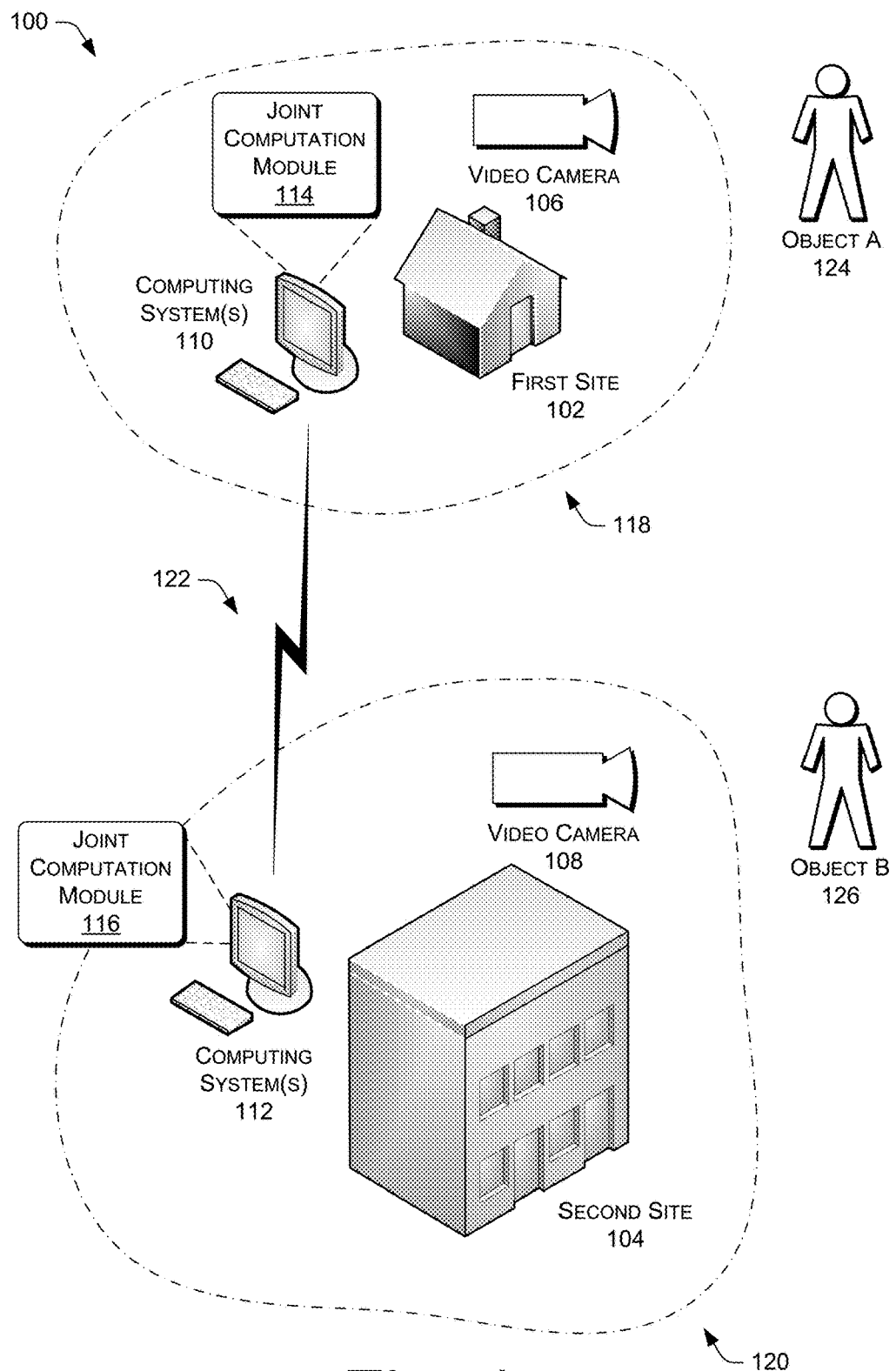
FIG. 1 is an illustrative architecture showing two sites equipped with video cameras collaborating to track an object.

FIG. 1 shows an architecture 100 in which a first site 102 performs privacy-preserving multi-camera tracking with a second site 104. For example, the first site 102 may be a residence located near to the second site 104 which may be a business. Both the first site 102 and the second site 104 are equipped with video cameras 106 and 108 respectively. Although each site 102 and 104 is shown as having only a single video camera 106 and 108 for simplicity, the sites 102 and 104 may each have more than one video camera. The video cameras 106 and 108 may use any technology for capturing video images and may capture images across any spectrum such as visible light, infrared, etc. A still camera that captures a series of still images in succession may be substituted for either of the video cameras 106 and 108.

Each of the sites 102 and 104 also contain one or more computing systems 110 and 112. The computing systems 110 and 112 may be integrated in whole or part with the video cameras 106 and 108. Alternatively, the video cameras 106 and 108 may simply provide video feeds to the respective computing systems 110 and 112. The computing systems 110 and 112 may also be implemented as a single device such as a desktop computer, notebook computer, net book, etc., a local system comprising multiple devices such as a server and local area network, a distributed system such as a cloud computing system that may be located remotely and accessed through a communications network, or any other system architecture for processing information.

Each of the computing systems 110 and 112 may include a joint computation module 114 and 116. The joint computation modules 114 and 116 may facilitate each of the respective computing system's 110 and 112 participation in secure multi-party computation. The joint computation modules 114 and 116 each provide an output that is usable by the other module for joint computation. However, the joint computation modules 114 and 116 may be implemented using different code, different programming languages, and the like. Further details of the joint computation modules 114 and 116 are provided below.

Each of the respective sites 102 and 104 exists within a privacy boundary 118 and 120. Within the privacy boundaries 118 and 120 there are no privacy concerns regarding sharing information. Privacy concerns arise when information is shared across one of the privacy boundaries 118 and 120.

In some implementations, the privacy boundaries 118 and 120 may include cameras, computing systems, and the like that are physically separated. For example, a portion of a one of the computing systems 110 and 112 implemented through a cloud computing architecture may utilize memory and processing resources that are physically remote from the respective site 102 and 104 but are nevertheless within the corresponding privacy boundary 118 and 120 due to a secure configuration of the cloud computing architecture. As an additional example, the business at site 104 may have multiple locations (e.g., retail stores) and share video information among separate locations without privacy concerns.

In the same or different implementation, physically proximate video cameras, computing systems and the like may be separated by a privacy boundary. For example, in an apartment building different residents may have their own video cameras. All of the video cameras, and possibly the respective computing systems connected to the video cameras, are located in the same apartment building. However, each of the individual residents may have privacy concerns regarding sharing video information with his or her neighbors. Thus, a single building may have multiple privacy boundaries within it.

In any of the above implementations, the computing systems 110 and 112 have at least one communication connection 122 used for communicating with another site 102 and 104 inside another privacy boundary 118 and 120 in order to perform the secure multi-party computation. The communication connection 122 may be a direct link between the computing systems 110 and 122 such as a physical cable or a wireless connection. Alternatively, the communication connection 122 may be made through a communications network that also handles communication traffic from other computing systems. The communications network may include any type of network for handling electronic data such as the Internet, a phone network, a cable network, etc.

In the architecture 100 each of the video cameras 106 and 108 captures video images of whatever background is in view of the video camera and foreground objects moving in front of that background. For example, the video camera 106 at the first site 102 may observe object A 124. The video camera 108 at the second site 104 may observe object B 126. Multi-camera tracking is used to determine if object A 124 is the same as object B 126. For example, the objects may both be people and secure multi-party computation implemented in part by the joint computation modules 114 and 116 can be used to determine if object A 124 is the same person as object B 126 while still keeping the content of the respective video feeds obtained by the sites 102 and 104 secret from each other.

Illustrative Computing Device

Figure 2:
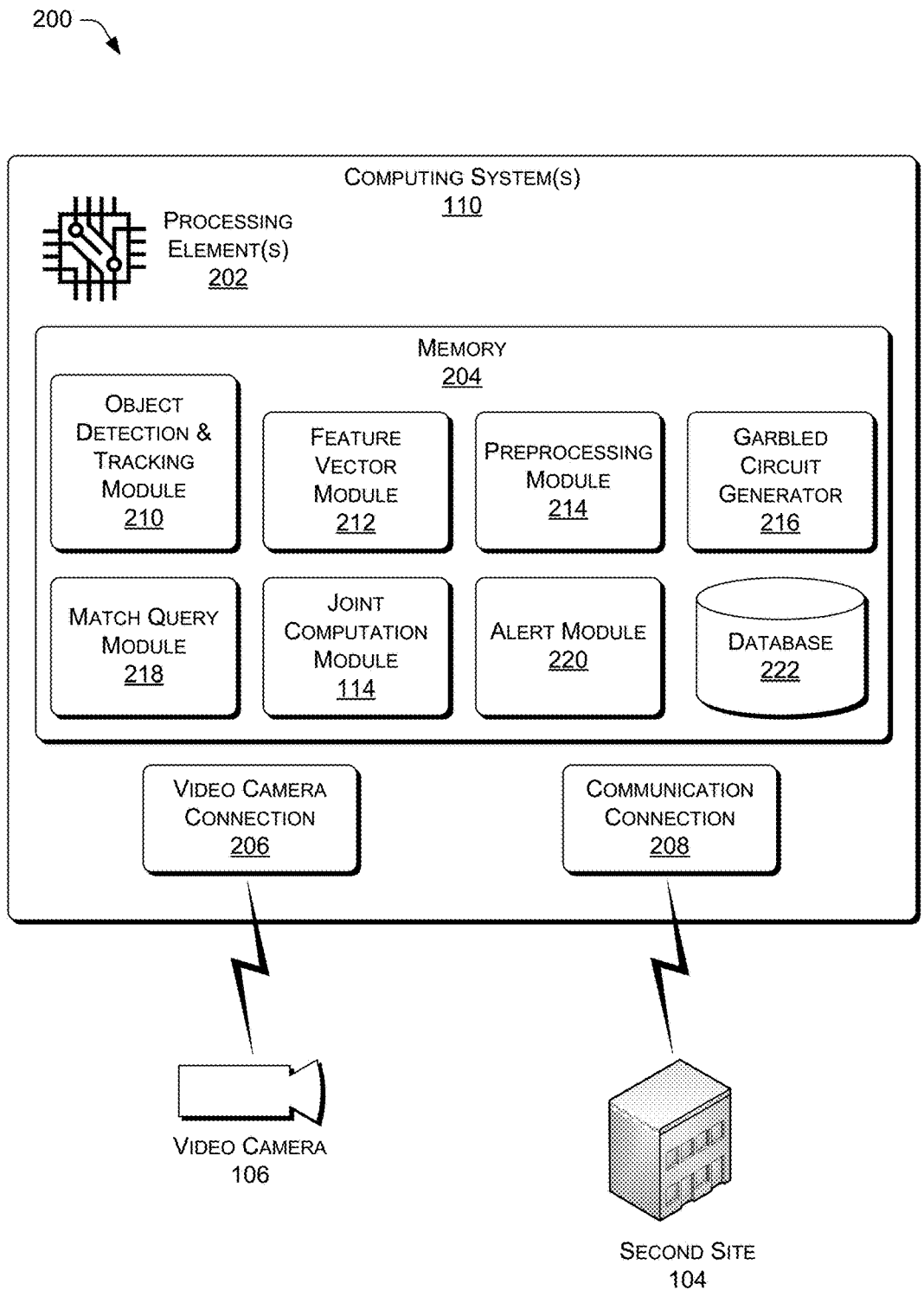
FIG. 2 is a block diagram of components that may be present in a computing system shown in FIG. 1.

FIG. 2 shows an illustrative block diagram 200 of components that may be included in the computing system(s) 110 of FIG. 1. The computing system(s) 112 of FIG. 1 may include similar components but is omitted for simplicity. The computing system(s) 110 contain one or more processing elements 202 and memory 204 distributed throughout one or more locations. The processing elements 202 may include any combination of central processing units (CPUs), graphical processing units (GPUs), single core processors, multi-core processors, application-specific integrated circuits (ASICs), and the like.

One or more of the processing element(s) 202 may be implemented in software and/or firmware in addition to hardware implementations. Software or firmware implementations of the processing element(s) 202 may include computer- or machine-executable instructions written in any suitable programming language to perform the various functions described. Software implementations of the processing elements(s) 202 may be stored in whole or part in the memory 204. The memory 204 may be volatile (such as RAM) and/or non-volatile (such as ROM, flash memory, etc.).

The computing system(s) 110 may also include additional computer-readable media such as removable storage, non-removable storage, local storage, and/or remote storage. The memory 204 and any associated computer-readable media may provide storage of computer readable instructions, data structures, program modules, and other data. Computer-readable media includes, at least, two types of media, namely computer-readable storage media and communications media.

Computer-readable storage media includes volatile and non-volatile, removable and non-removable media implemented in any method or technology for storage of information such as computer-readable instructions, data structures, program modules, or other data. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer-readable storage media and communication media are mutually exclusive.

The computing system(s) 110 include a video camera connection 206 that may provide hardware and/or software interfaces for receiving a video feed from the video camera 106 and providing commands to the video camera 106. A communication connection 208 may connect the computing system(s) 110 to other computing systems such as those at the second site 104. The communication connection 208 may include hardware such as a socket for a network cable or antenna for radio transmissions as well as software for processing incoming and outgoing signals.

The block diagram 200 shows multiple modules included within the memory 204. These modules may be implemented in software and alternatively, or in addition, implemented, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

An object detection and tracking module 210 detects an object in a video feed from the video camera 106 when the object is in view of the video camera 106. For example, the object may be object A 124 shown in FIG. 1. The object detection and tracking module 210 can track objects across frames within a single camera such as video camera 106. The computation performed by the object detection and tracking module 210 involves only local processing (i.e., no information exchange needed), and thus, does not affect secure computation.

For one or more frames in the video feed obtained from a video camera 106, the object detection module 210 may perform background subtraction followed by blob extraction. Background subtraction maintains a statistical background model that may be represented as a Gaussian distribution per pixel. For each pixel in a new frame, the statistical background model may be used to determine whether the pixel belongs to the background or foreground. While the module is making this determination, the mean and variance parameters of the background model can be updated. The output of the background subtraction may be a binary image where 0 indicates background and 1 indicates foreground. After background subtraction, morphological reconstruction filters may be used to remove noise, connect broken regions of the foreground, and smooth the shapes of the foreground pixels. Finally, the 4-connected neighbor rule can be used to extract the blobs that represent foreground objects.

The object detection and tracking module 210 may maintain a list of objects that are present in view of the video camera 106. Information stored for each of the objects in the list may include a state of the tracked objects including their location, size, and velocity. Given the extracted blobs of a new frame, a Kalman filter can be used to estimate the current state of a tracked object. The object detection and tracking module 210 then determines whether a tracked object is under occlusion by checking if a predicted state of the tracked object is consistent with the observation in the new frame. If the tracked object is not occluded, the result from blob extraction is regarded as reliable, and the nearest blob is selected as the corresponding measurement. Otherwise, the mean-shift method may be used to obtain the measurement. By using the measurement obtained either from the result of blob extraction or the result of the mean-shift method, it is possible to update the Kalman filter and obtain the current state even of occluded objects.

The feature vector module 212 can extract a feature vector from an object identified by the object detection and tracking module 210. Some computer vision algorithms use face or license plate features for identifying humans or cars captured in a video feed. However, in an uncontrolled environment like a neighborhood, these features may be unreliable since video cameras do not always capture a clear view of the face or license plate of an object. Therefore, the whole-body appearance of the object may provide a better basis for feature vector extraction.

Two categories of features that may be used in object matching (or re-identification) are local descriptors and global features. Local descriptors are extracted from interest points on the objects, and the matching is performed using a voting scheme. Because local descriptors compute interest point detection in the feature extraction phase, this can add to the processing overhead and potentially affect accuracy. Global features are easier to compute and some are effective for person re-identification. For example, color histograms and texture histograms may be used to create feature vectors from the whole-body or different parts of the body of an object such as a person or car. One technique for generating a color histogram includes dividing an object into six horizontal regions. In each region, color histograms of RGB, YCbCr, and HSV color spaces are extracted. In this technique, each channel has 64 bins, and the histograms are concatenated into the feature vector in a 3456-dimension feature space.

A preprocessing module 214 performs local processing of the feature vector by normalizing the feature vector and quantizing the feature vector into an integer value to form a secure input. For example, feature vectors may be transformed into the secure input which can be a vector that has low dimensional integer entries. The preprocessing module 214 may perform a local computation portion of a vector distance function that is decomposed into local and joint computation portions. The decomposition minimizes the parts of the vector distance function that are affected by the complexity of secure computation because the local computation portion may be solved without privacy-protecting security.

The feature vector generated by the feature vector module 212 may be a real-valued feature vector $x_i \in \mathbb{R}^d$, and it may be transformed by the preprocessing module 214 into $z_i \in \mathbb{R}^q$ with much lower dimension based on Principal Component Analysis (PCA) and linear mapping by Equation 1

$$z_i = W^T P^T (x_i - \bar{x}) + T1,$$

where W, P, $\bar{x}$ and T are parameters obtained in a training stage, and are known by both the first site 102 and the second site 104. The training stage is discussed in greater detail below. The secure two-party computation performed later can take integer input, so each entry of $z_i$ may be normalized to a real number from 0 to 1 and further quantized into an l-bit integer value to form a q-dimensional input vector $\hat{z}_i$ which can be used as a secure input to a garbled circuit.

Matching accuracy may be improved with an offline training phase in order for the vector matching function to learn the distance metric. This learning may be done in a pairwise manner. That is, a set of parameters may be learned for each pair of cameras (e.g., video camera 106 and video camera 108), rather than learning global parameters. Objects by the camera that the site owners have indicated a willingness to share publicly may be used as inputs for the learning.

A garbled circuit generator 216 generates a garbled circuit for the joint computation portion of the vector distance function. Inputs to the garbled circuit comprise the secure input from the first site 102 and a secure input from the second site 104. The second site 104 generates the secure input by local processing using techniques that are the same or similar to those described above for the first site 102.

The secure computation protocol may be based on a Boolean circuit for a predefined distance function $D(x_i, x_j)$. One party (the circuit generator, here the first site 102) prepares a garbled version of the circuit and the second party (the circuit evaluator, here the second site 104) obliviously computes the output of the garbled circuit. Thus, both parties learn the output of the circuit, but neither party has access to the other's input.

A match query module 218 sends a query via the communication connection 208 to the second site 104 to request participation in solving the jointly-computed portion of the vector distance function. The match query module 218 may send a secure matching function evaluation request to one or more peer sites such as the second site 104 every time the object detection and tracking module 210 records that a suspicious object has entered the view of the video camera 106. Suspicious object may be defined by criteria that are local to the computing system(s) 110. For example, feature vectors of suspicious or "blacklisted" objects may be stored in the database 222 and newly detected objects may be compared against this list of suspicious objects. A secure matching function evaluation request may also be sent when an object enters or leaves the view of the video camera 106.

The computing system(s) 110 may issue secure matching function evaluation requests to some or all of the other participating sites. The issuing system (e.g., computing system(s) 110 of the first site 102) becomes a client and the responding system (e.g., computing system(s) 112 of the second site 104) becomes a server for secure function evaluation. However, as more sites join a surveillance community, the overhead will increase, requiring individual sites to equip with more powerful processing elements and more memory. However, the topology of cameras may be used to improve matching efficiency. Based on an object's time and spatial information, sites can send matching requests only to select other sites that have video cameras positioned to cover locations where the object is likely to travel next.

The joint computation module 114 introduced in FIG. 1 solves the jointly-computed portion of the vector distance function with the second site 104 to determine if the first object (e.g., object A 124) is the same as the second object (e.g., object B 126). Matching between input vectors may be performed through secure two-party computation using the joint computation module 114 of the first site 102 and the joint computation module 116 of the second site 104. The garbled circuit constructed by the garbled circuit generator 216 and used for joint computation portion of the vector distance function, is an "efficient" circuit because it may be constructed to use only integer comparison (CMP), min (MIN), and addition (ADD) circuits. The garbled circuit takes as input the two input vectors from the sites 102 and 104 and a comparison threshold used to set the stringency of matching. If the computed distance between the two input vectors is smaller than the comparison threshold, the vectors are regarded as matching (i.e., object A 124 and object B 126 are the same object).

An alert module 220 generates an alert depending on if the first object is or is not the same as the second object. In some implementations, the alert module 220 may generate the alert in real time essentially as soon as a result is received from the joint computation module 114. Depending on the criteria used to determine whether a particular behavior is "suspicious" behavior or not, either the presence or the absence of a match may be a trigger for an alert. The alert may be a local alert shared only with the first site 102, shared only with the first site 102 and the second site 104, or the alert may be shared with other sites that are connected to either the first site 102 or the second site 104.

A database 222 may also be present in a computing system(s) 110 either in the memory 204 or another location. The database 222 may store information such as feature vectors extracted from objects that have been in the view of the video camera 106. Thus, the computing system(s) 110 may store a record of all the objects seen by storing the corresponding feature vectors. This database 222 may be queried in response to an incoming match request from another site (e.g., second site 104). Thus, the computing system(s) 110 when functioning as a server may respond to queries not only for objects that are currently in view of the video camera 106 but also for objects that have previously been viewed and are stored, as feature vectors, in the database 222. Each record in the database 222 may be associated with entry and exit timestamps recording when the object entered and left the view of the video camera 106. This may enable sites in a surveillance community to track how an object moves through the community. The path of the object may be used as a trigger to raise one or more alerts.

Comparison of Distance Learning Techniques

Distance metric learning is one way to improve matching accuracy by training a distance function $D(x_i, x_j)$ where $x_i$ and $x_j$ represent feature vectors extracted from objects. However, many distance metric learning techniques are computationally expensive and inefficient for secure two-party computation. One goal of distance metric learning is to learn a distance function that can discriminate positive and negative examples (e.g., objects known to be the same and objects known to be different). That is, the distance calculated by an effective distance function $D(x_i, x_j)$ is likely to be small when $x_i$ and $x_j$ correspond to the same object and large when $x_i$ and $x_j$ correspond to different objects.

A secure computation protocol starts with a Boolean circuit for $D(x_i, x_j)$. A portion of the circuit may be garbled to provide privacy. The garbling involves generating keys to each wire and generating a garbled truth table for each gate. Thus, the number of gates determines the complexity of a garbled circuit, impacting the performance of generating and evaluating the garbled circuit. However, XOR gates come "free" meaning that cryptographic operations are not required for computing outputs from XOR gates in garbled circuits. Table I compares the size (as measured in terms of the number of non XOR gates) of efficient circuit constructions for basic functions that compute on two l-bit integers (i.e., the input vectors may be converted to integer values before being used as inputs to the garbled circuit).

TABLE I

Gate Counts for Basic Garbled Circuits

| basic circuits | | non XOR gates |
|---|---|---|
| addition | ADD(l) | 1 |
| subtraction | SUB(l) | 1 |
| multiplication | MUL(l) | $2l^2 - 1$ |
| comparison | CMP(l) | 1 |
| multiplexer | MUX(l) | 1 |
| minimum | MIN(l) | 2l |

Figure 3:
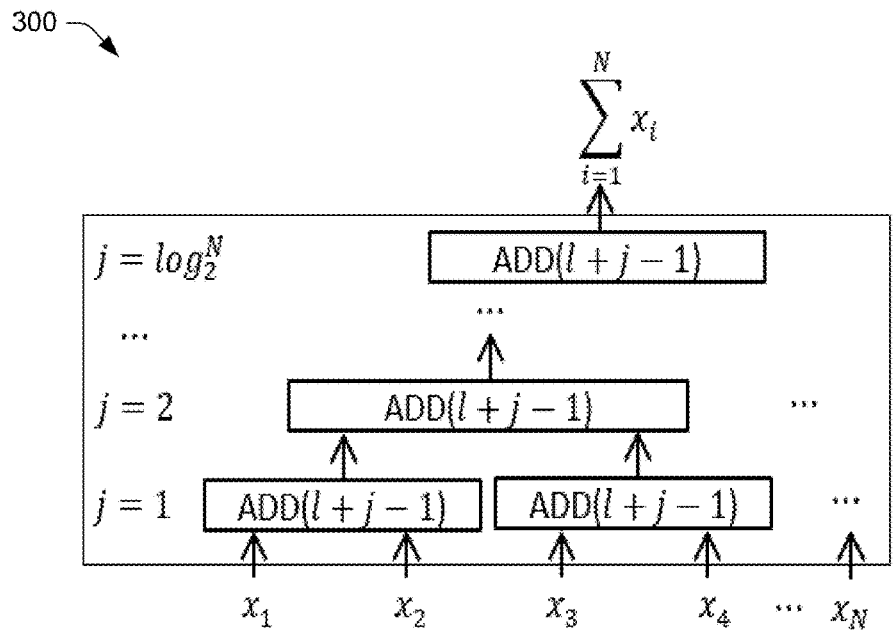
FIG. 3 shows an ADD*(N,l) garbled circuit when N is in power of 2.

Creating efficient circuits for functions that are commonly used when computing distance metrics can decrease the final processing complexity. One function that is commonly used when computing distance metrics is, $ADD^*(N,l) = \Sigma_{j=1}^{N} x_j$, where $x_j$ is an l-bit integer. FIG. 3 shows a garbled circuit construction 300 of this function when N is in power of 2. In the construction 300 ADD circuits are connected in a hierarchical fashion to minimize table size. The output of $ADD^*(N,l)$ is a $(l+\log_2 N)$-bit integer. Since the number of non XOR gates of ADD(l) circuit is $|ADD(l)|=1$ as shown in Table I above, the size of $ADD^*(N,l)$ is defined by Equation 2

$$|ADD^*(N, l)| = \sum_{j=1}^{\log_2 N} \frac{N}{2^j} \cdot |ADD(l + j - 1)| = Nl + N - l - 1 - \log_2 N.$$

Figure 4:
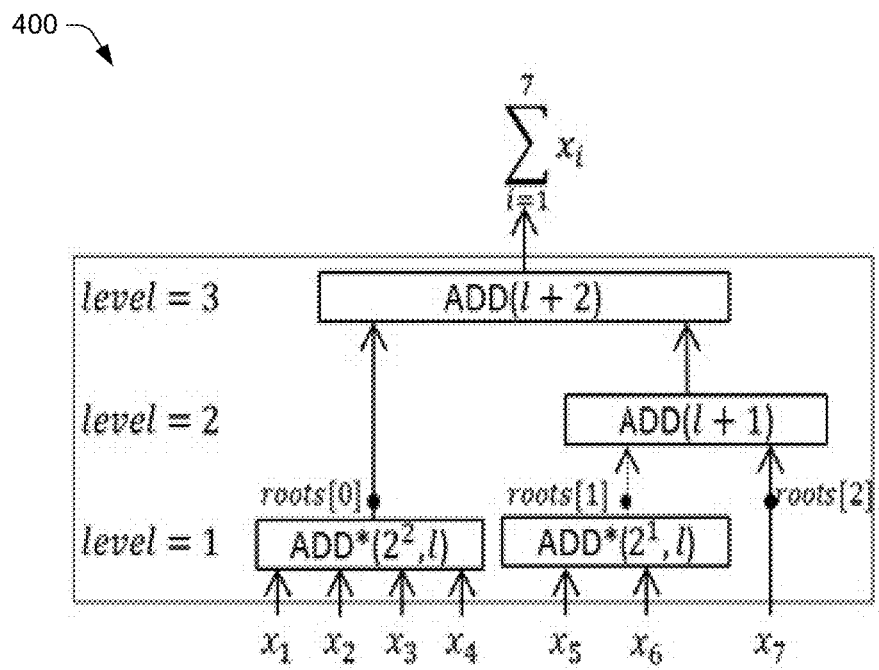
FIG. 4 shows an ADD*(N,l) garbled circuit when N is not in power of 2.

FIG. 4 shows a more generalized garbled circuit construction 400 of the $ADD^*(N,l) = \Sigma_{j=1}^{N} x_j$ circuit when N is not in power of 2 (e.g., N=7). First, N is decomposed into the summation of a set of numbers consisting of power of 2 as shown in Equation 3.

$$K \leq \lceil \log_2 N \rceil, N = \sum_{i=0}^{K-1} 2^{\alpha_i}, \log_2 N \geq \alpha_{K-1} > \ldots > \alpha_0 \geq 0$$

For i=0 to K−1, the summation of $2^{\alpha_i}$ numbers is computed by constructing sub-circuits $ADD^*(2^{\alpha_i},l)$. By using ADD(·), the outputs of these sub-circuits are further added up sequentially in the order from the one with smallest number of bits to the one with largest number of bits. The size of $ADD^*(N,l)$ is equal to gateN. The algorithm for $ADD^*(N,l)$ when N is not in power of 2 is below.

1. Initial X = N, t = 0, s = K − 1, and gateN = 0. $N = \Sigma_{i=0}^{K-1} 2^{\alpha_i}$, $\log_2 N \geq \alpha_{K-1} > \ldots > \alpha_0 \geq 0$
2. while(X > 1)
3.     $m = 2^{\alpha_s}$
4.     construct sub-circuit $ADD^*(m,l)$
5.     roots[t] = output of $ADD^*(m,l)$
6.     gateN = gateN + $|ADD^*(m,l)|$, where $|ADD^*(m,l)|$ is obtained by the equation for the size of $ADD^*(N,l)$
7.     X = X − m
8.     t = t + 1
9.     s = s − 1
10. end while
11. if(X == 1)
12.     roots [t] = the remaining $x_j$
13. end if
14. Initial r = K − 1, right_tree = roots[K − 1]
15. while(r ≥ 1)
16.     Connect roots[r−1] and right_tree with an $ADD(l + \alpha_{K-r})$ circuit.
17.     right_tree = output of the above ADD circuit
18.     gateN = gateN + $|ADD(l + \alpha_{K-r})|$
19.     r = r − 1
20. end while In the following discussion of distance metric learning functions, $x_i \in \mathbb{R}^d$ denotes the original real-valued feature vector. Let $\mathbb{O}^p$ denote the positive training set consisting of matched feature vector pairs, and let $\mathbb{O}^n$ denote the negative training set consisting of unmatched feature vector pairs.

One distance metric learning function that may be used for object matching is the person re-identification by Probabilistic Relative Distance Comparison (PRDC). The PRDC distance function is shown in Equation 4:

$$D_1(x_i, x_j) = |x_i - x_j|^T W W^T |x_i - x_j| = \|W^T |x_i - x_j|\|^2$$

where $|\cdot|$ is the entry-wise absolute function; $\|\cdot\|$ is L2 norm; $W = [w_1 \ldots w_L] \in \mathbb{R}^{d \times L}$ and $L \ll d$. Note that $|x_i - x_j|$ needs to be computed privately (i.e., jointly) as it involves both feature vectors.

As a result, the computation of the PRDC function in secure two-party computation involves subtraction, absolute value calculation, multiplication, and addition. Moreover, the computation often operates in high dimensional space, i.e., d is usually quite large, which adds computational overhead when considering the secure two-party computation. Table II shows the computational complexity of the secure two-party computation implementation of $D_1(\cdot)$.

TABLE II

| PRDC | | |
|---|---|---|
| | intermediate steps | circuits needed |
| 1 | $|x_i - x_j|$ | d subtraction |
| | | d absolute value |
| 2 | $W^T |x_i - x_j|$ | d × L multiplication |
| | | (d − 1) × L addition |
| 3 | $\| W^T |x_i - x_j| \|^2$ | L multiplication |
| | | (L − 1) addition |

The first intermediate step of Table II shows computing the absolute value of the subtraction of two l-bit integers (assuming each input element is quantized to be an l-bit integer). This circuit can be constructed by connecting 2Sorter(l) (which takes two l-bit integers, x and y, and outputs min(x,y) and max(x,y)) and one regular subtraction circuit. Thus, this first intermediate step requires d numbers of 2Sorter(l) and SUB(l) circuits.

The second intermediate step of Table II performs d×L multiplications of two l-bit integers which are the outputs of the first intermediate step. Then, the second intermediate step adds d elements of the multiplication results, which are 2l-bit integers.

The third intermediate step of Table II first performs L multiplications of two $(2l+\log_2 d)$-bit integers and the output of each multiplication which is a ($4l+2 \log_2 d$)-bit integer. This is summed up (L elements total) and the output which is a ($4l+2 \log_2 d + 2 \log_2 L$)-bit integer that is compared against the threshold. The distance threshold for match determination is estimated in a training stage to achieve appropriate true positive rates and false positive rates. In sum, the number of non XOR circuits for PRDC is shown by Equation 5

$$|PRDC| = d \cdot |2Sorter(l)| + d \cdot |SUB(l)| +$$
$$dL \cdot |MUL(l)| + L \cdot |ADD^*(d, 2l)| + L \cdot |MUL(2l + \log_2 d)| +$$
$$|ADD^*(L, 4l + 2\log_2 d)| + |CMP(4l + 2\log_2 d + \log_2 L)| =$$
$$2dl^2 L + dlL + 8l^2 L + 3dl + dL + 2L(\log_2 d)^2 + 8lL\log_2 d - 1.$$

Since d is large and multiplication is expensive to implement in secure two-party computation, the PRDC function incurs high computing overhead. Computational complexity may be reduced by omitting the absolute-value functions to arrive at the PRDC without absolute values function which is Equation 6:

$$D_2(x_i, x_j) = (x_i - x_j)^T WW^T (x_i - x_j) = \|W^T x_i - W^T x_j\|^2,$$

where $W=[w_1 \ldots w_L] \in \mathbb{R}^{D \times L}$ and $L \ll d$. Note that $W^T x_i$ and $W^T x_j$ can be computed locally by each camera without invoking secure two-party computation. As a result, the computational complexity is reduced significantly as shown in Table III.

TABLE III

PRDC w/o absolute values

| | intermediate steps | circuits needed |
|---|---|---|
| 1 | $W^T x_i, W^T x_j$ | (local computation) |
| 2 | $W^T x_i - W^T x_j$ | L subtraction |
| 3 | $\|W^T x_i - W^T x_j\|^2$ | L multiplication |
| | | (L − 1) addition |

For PRDC without absolute values, $W^T x_i$ is assumed to be quantized to be an l-bit integer. Construction of the circuits in the intermediate steps of Table III is straightforward to one of ordinary skill in the art and omitted. The non-XOR circuit size for PRDC without absolute values is found by Equation 7:

$$|PRDC\_woABS| = L \cdot |SUB(l)| + L \cdot |MUL(l)| + |ADD^*(L, 2l)| + |CMP(2l + \log_2 L)| = 2l^2 L + 2lL + L - 1.$$

Another technique for performing visual matching is Metric learning by Collapsing Classes (MCC). With MCC, use of Principal Component Analysis (PCA) for dimensionality reduction reduces the amount of computation in the training stage, especially if the feature space is high dimensional. Assume $\hat{x}_i \in \mathbb{R}^r$ ($r \ll d$) is the new feature vector after PCA, that is, Equation 8, $$\hat{x}_i = P^T (x_i - \bar{x})$$

where $P \in \mathbb{R}^{d \times r}$ is projection matrix that maps the original d-dimension space into r dimensions ($r \ll d$); $\bar{x} \in \mathbb{R}^d$ is the mean vector over all the training data. The distance function is expressed as Equation 9:

$$D_3(\hat{x}_i, \hat{x}_j) = (\hat{x}_i - \hat{x}_j)^T WW^T (\hat{x}_i - \hat{x}_j) = \|W^T \hat{x}_i - W^T \hat{x}_j\|^2,$$

where $=[w_1 \ldots w_q] \in \mathbb{R}^{r \times q}$, $r \ll d$, and $q \leq r$. Similar to PRDC without absolute values, $W^T \hat{x}_i$ and $W^T \hat{x}_j$ can be computed locally without invoking secure two-party computation. In addition, the dimensionality reduction is also performed locally. However, as shown in Table IV, the secure computation portion of the function uses multiplication circuits which are computationally expensive.

TABLE IV

MCC

| | intermediate steps | circuits needed |
|---|---|---|
| 1 | $\hat{x}_i = P^T (x_i - \bar{x})$ | (local computation) |
| 2 | $W^T \hat{x}_i, W^T \hat{x}_j$ | (local computation) |
| 3 | $W^T \hat{x}_i - W^T \hat{x}_j$ | q subtraction |
| 4 | $\|W^T \hat{x}_i - W^T \hat{x}_j\|^2$ | q multiplication |
| | | q − 1 addition |

Similar to PRDC without absolute values, $W^T x_i$ is assumed to be quantized to be an l-bit integer. The circuits for each of the intermediate steps of Table IV are similar to the circuits for PRDC without absolute values shown in Table III but with L replaced by q. Therefore, the circuit size for MCC is found by Equation 10:

$$|MCC| = q|SUB(l)| + q \cdot |MUL(l)| + |ADD^*(q, 2l)| + |CMP(2l + \log_2 q)| = 2l^2 q + 2lq + q - 1.$$

An alternative function may be developed by realizing that learning the function $D(\cdot)$ is equivalent to learning the parameter W and observing that the distance function used for MCC, $D_3(\cdot)$, is equivalent to computing a Euclidean distance in an alternate vector space specified by W. Replacing the Euclidean distance function with a histogram intersection function after linearly projecting onto a new vector space specified by W avoids the secure multiplication operation shown in the forth intermediate step of Table IV.

The histogram intersection function is defined in Equation 11 as:

$$HI(h_i, h_j) = \Sigma_{k=1}^q \min(h_i^k, h_j^k),$$

where $h_i = [h_i^1 \ldots h_i^q]^T \in \mathbb{R}_+^q$, $h_j = [h_j^1 \ldots h_j^q]^T \in \mathbb{R}_+^q$ are the vectors with nonnegative entries. The distance function referred to herein as Blind Tracking Distance Computation (BTDC) is Equation 12:

$$D_4(\hat{x}_i, \hat{x}_j) = -HI(W^T \hat{x}_i + T\mathbf{1}, W^T \hat{x}_j + T\mathbf{1}) = -\sum_{k=1}^q \min(w_k^T \hat{x}_i + T, w_k^T \hat{x}_j + T),$$

where $W=[w_1 \ldots w_q] \in \mathbb{R}_{r \times q}$, $r \ll d$ and q and $T \geq 0$ is a predefined parameter that ensures the non-negativity of $w_k^T \hat{x}_i + T$ for any feature vector $\hat{x}_i$. The BTDC function is computationally efficient in part because computation is shifted locally (i.e., where there are no privacy concerns) and joint computation is minimized. The Boolean circuits used to represent the BTDC function are shown in Table V.

TABLE V

BTDC

| | intermediate steps | circuits needed |
|---|---|---|
| 1 | $\hat{x}_i = P^T (x_i - \bar{x})$ | (local computation) |
| 2 | $W^T \hat{x}_i + T\mathbf{1}, W^T \hat{x}_j + T\mathbf{1}$ | (local computation) |
| 3 | min(.) | q min operation |
| 4 | $\Sigma_{k=1}^q \min(.)$ | (q − 1) addition |

The first and second intermediate steps of Table V are preprocessing steps performed by local computation. For example, these steps may be performed by the preprocessing module 214. Given any real-valued feature vector $x_i \in \mathbb{R}^d$, the feature vector can be transformed into $z_i \in \mathbb{R}^q$ with much lower dimension based on PCA and linear mapping using Equation 13, $$z_i = W^T P^T (x_i - \bar{x}) + T1,$$

where W, P, $\bar{x}$, and T are parameters obtained in a training stage and known by both sites 102 and 104. The secure two-party computation represented by the third and fourth intermediate steps of Table V may take only integer input, therefore each entry of $z_i$ may be first normalized to a real number from 0 to 1 and further quantized into an l-bit integer value to form a q-dimensional input vector $\hat{z}_i$.

Figure 5:
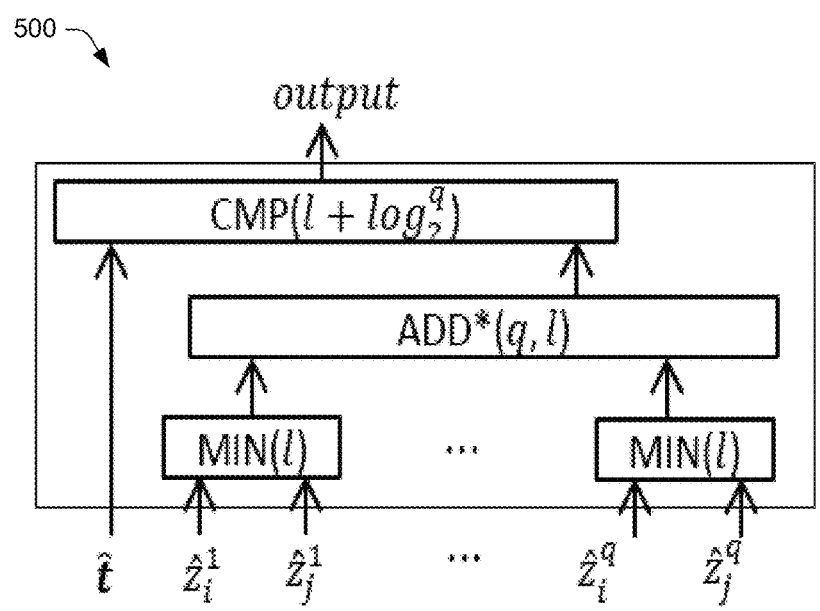
FIG. 5 shows a blind tracking distance computation (BTDC) garbled circuit.

The matching between input vectors $\hat{z}_i$ and $\hat{z}_j$ is performed through secure two-party computation. BTDC simplifies the garbled circuit needed for secure function evaluation, as it only requires integer comparison (CMP), min (MIN), and addition (ADD). The garbled circuit uses two vectors, $\hat{z}_i$ and $\hat{z}_j$ (q l-bit integers) and the comparison threshold $\hat{t}$ as inputs. FIG. 5 shows the garbled circuit of the BTDC distance function. The circuit size for BTDC is found by Equation 14:

$$|BTDC| = q \cdot |MIN(l)| + |ADD^*(q,l)| + |CMP(l + \log_2 q)| = 3ql + q - 1.$$

The parameter W from $D_4(\cdot)$ above may be learned by learning a linear projection matrix, such that the pairs in set $\mathbb{O}^p$ have small distances, and the pairs in set $\mathbb{O}^n$ have large distances. This can be achieved by defining a conditional distribution over points $i \neq j$ such that Equation 15 is $$p^W(j|i) = \frac{e^{-D(\hat{x}_i, \hat{x}_j)}}{Z_i} = \frac{e^{-D(\hat{x}_i, \hat{x}_j)}}{\sum_{k \neq i} e^{-D(\hat{x}_i, \hat{x}_k)}} \quad i \neq j$$

Ideally, if all the pairs in set $\mathbb{O}^p$ have small distance, and all the pairs in set $\mathbb{O}^n$ have large distances, the distribution becomes "bi-level," that is, Equation 16:

$$p_0(j|i) \propto \begin{cases} 1 & \text{if } (\hat{x}_i, \hat{x}_j) \in \mathbb{O}^p \\ 0 & \text{if } (\hat{x}_i, \hat{x}_j) \in \mathbb{O}^n \end{cases}$$

Therefore, the cost function $f_1(W)$ is defined as Equation 17:

$$f_1(W) = \sum_i KL[p_0(j|i) \| p^W(j|i)] = \sum_i \sum_{j \neq i} p_0(j|i) \times \log\left(\frac{p_0(j|i)}{p^W(j|i)}\right),$$

where KL[·] is K-L divergence which measures the distance between two distributions. Substitution of Equations 16 and 17 yields Equation 18, $$f_1(W) = \sum_{\substack{i,j \\ (\hat{x}_i, \hat{x}_j) \in \mathbb{O}^p}} D_4(\hat{x}_i, \hat{x}_j) + \sum_i \log(Z_i)$$

A regularization term $f_2(W)$ bounds the values of $W^T \hat{x}_i$ in such a way that a nonnegative scalar T to make all the entries in $W^T \hat{x}_i + T1$ nonnegative for all i always exists. This is done by denoting the original high dimensional feature vector as $$x_i = \begin{bmatrix} x_{i1} \\ \vdots \\ x_{id} \end{bmatrix}.$$

Since the BTDC computation uses a histogram-based feature, each entry is a real number from zero to one. Because the principal component matrix $P = [p_1 \ldots p_r]$ is a unitary matrix, the entries of the new vector after dimensional reduction, Equation 19, $$\hat{x}_i = \begin{bmatrix} \hat{x}_{i1} \\ \vdots \\ \hat{x}_{id} \end{bmatrix} = P^T(x_i - \bar{x})$$

are bounded. Assume $\|\hat{x}_i\|_2 \leq \theta$, and according to the Cauchy-Schwarz inequality, Equation 20 is $$(w_k^T \hat{x}_i)^2 \leq \|w_k\|_2^2 \|\hat{x}_i\|_2^2 \leq \|w_k\|_2^2 \times \theta^2.$$

In order to confine the dynamic range of $w_k$, the term $\sum_{k=1}^q w_k^T w_k = Tr(W^T W)$ may be added as another cost function to make $\|w_k\|_2^2$ bounded. If $\|w_k\|_2^2$ is bounded, $(w_k^T \hat{x}_i)^2$ is bounded; that is, for all the vectors $\hat{x}_i$, there exists a nonnegative scalar T such that $w_k^T \hat{x}_i + T \geq 0$, $\forall k$. This yields Equation 21:

$$f_2(W) = \sum_{k=1}^q w_k^T w_k = Tr(W^T W).$$

Moreover, to satisfy the equality of self-distance, that is, Equation 22, $$D_4(\hat{x}_k, \hat{x}_k) = D_4(\hat{x}_l, \hat{x}_l) \text{ for all } k \neq l$$

an additional term $f_3(W)$ is added. In order to make the distance metric function $D_4(\cdot)$ valid, self-distance of all the given feature vectors $\hat{x}_i$ may be the same. Thus, Equation 23:

$$D_4(\hat{x}_i, \hat{x}_i) = -HI(W^T \hat{x}_i + T1, W^T \hat{x}_i + T1) =$$
$$-\sum_{k=1}^q \min(w_k^T \hat{x}_i + T, w_k^T \hat{x}_i + T) = -\sum_{k=1}^q w_k^T \hat{x}_i + qT$$

Assuming $\sum_{k=1}^q w_k^T \hat{x}_i$ equals to zero for all i, $D_4(\hat{x}_k, \hat{x}_k)$ is equal to $D_4(\hat{x}_l, \hat{x}_l)$ for all $k \neq l$. Introducing the cost function $\sum_i (\sum_{k=1}^q w_k^T \hat{x}_i)^2$ into the objective function gives Equation 24:

$$f_3(W) = \sum_i \left(\sum_{k=1}^q w_k^T \hat{x}_i\right)^2.$$

The final objective function is the sum of the above three terms, Equation 25:

$$J(W) = f_1(W) + f_2(W) + f_3(W)$$

Then, the metric learning problem is formulated as finding W that minimizes the objective function J(W) as in Equation 26:

$$\hat{W} = \underset{W}{\operatorname{argmin}} J(W)$$

Gradient descent method may be employed to solve the optimization problem. The gradient vector is Equation 27, $$\frac{\partial J(W)}{\partial w_k} = \sum_i \sum_{j \neq i} ((p_0(j|i) - p^W(j|i)) \times g(\hat{x}_i, \hat{x}_j, w_k)) +$$

$$2w_k + 2\sum_i \left(\left(\sum_{l=1}^q w_l^T \hat{x}_i\right) \hat{x}_i\right),$$

where, Equation 28, $$g(\hat{x}_i, \hat{x}_j, w_k) = \begin{cases} -\hat{x}_i & \text{if } w_k^T \hat{x}_i < w_k^T \hat{x}_j \\ -\hat{x}_j & \text{if } w_k^T \hat{x}_i > w_k^T \hat{x}_j \\ -\frac{1}{2}(\hat{x}_i + \hat{x}_j) & \text{if } w_k^T \hat{x}_i = w_k^T \hat{x}_j \end{cases}$$

Accuracy and computational efficiency of the BTDC computation are discussed below.

Illustrative Process

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process, or an alternate process. Moreover, it is also possible that one or more of the provided operations may be modified or omitted.

Figure 6A:
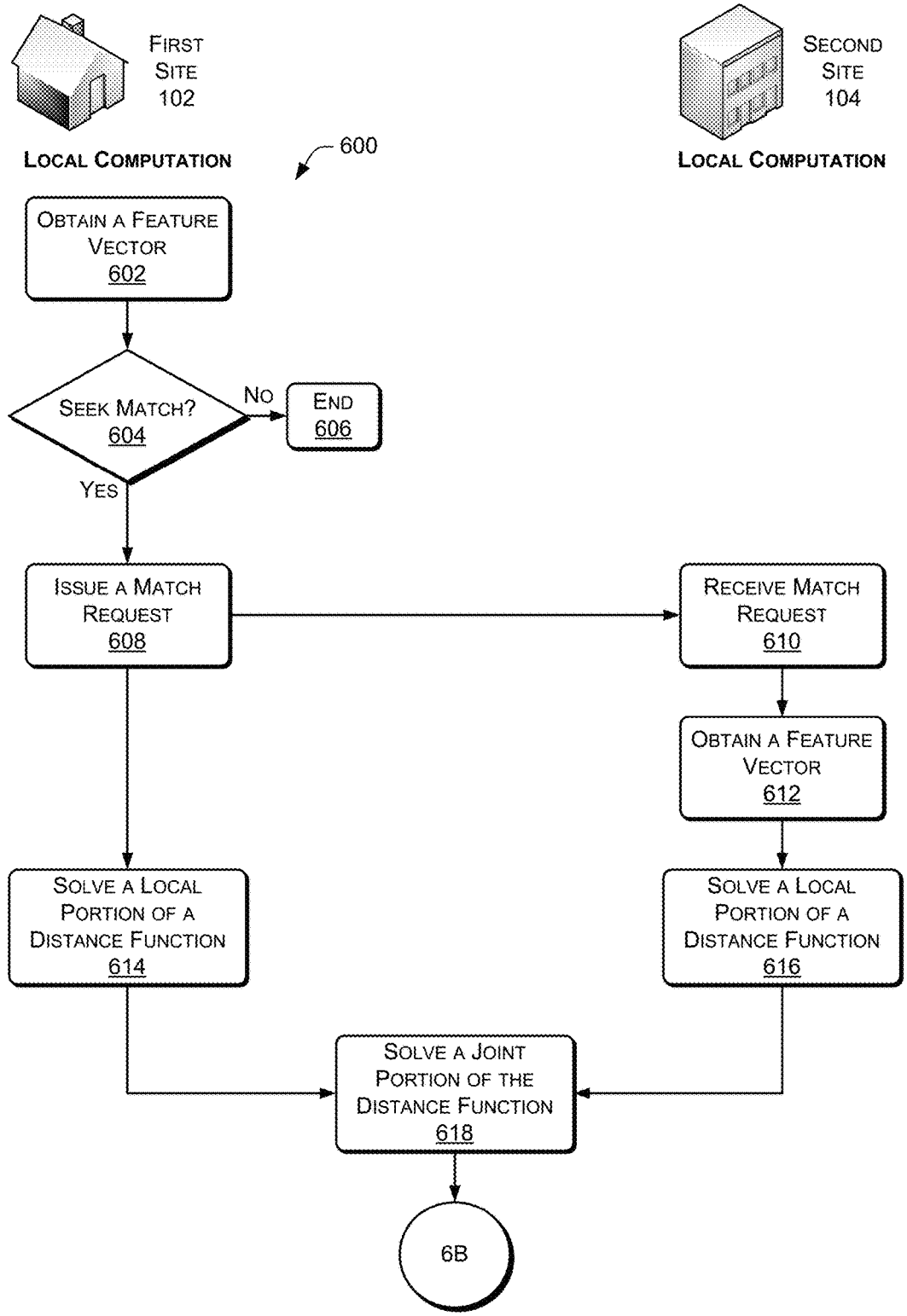
FIGS. 6A and 6B show an illustrative process for joint computation of a match between two feature vectors.
Figure 6B:
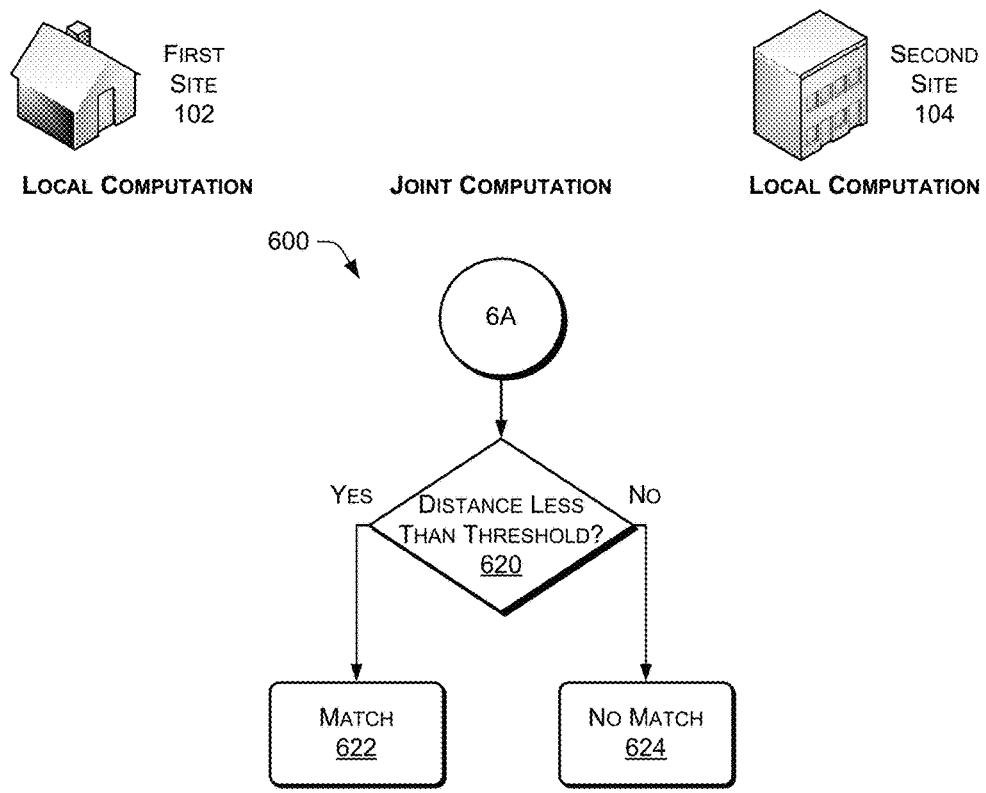

FIGS. 6A and 6B show process 600 illustrated as a collection of blocks in a logical flowchart, which represents a sequence of operations that can be implemented in hardware, software, or a combination of hardware and software. For discussion purposes, the processes are described with reference to the architecture, and computing systems, shown in FIGS. 1 and 2. However, process 600 may be performed using different architectures and/or computing systems.

At 602, a first feature vector is obtained. The first feature vector may be a private input that the first site 102 desires to keep secret from the second site 104. The first feature vector may be extracted from an object viewed by the video camera 106 of the first site 102. However, other types of private inputs such as still images, images of human faces, handwritten text, biometric features, or the like may also be the source of the first feature vector. The first feature vector may be quantized into an integer value for later processing.

At 604, it is determined if the object is an object for which the system will seek a possible match with a peer site (e.g., second site 104). A determination to seek a match for a given object may be based on the first object matching an object of interest, entering the view of the first video camera 106, leaving the view of the first video camera 106, or for another reason. Determining that the object matches an object of interest may be performed locally at the first site 102 using a distance matching function that is not necessarily private or secure. The match may be performed by comparing the first feature vector to stored feature vectors that are labeled as "objects of interest." For example, in a security implementation, cars that belong to known criminals may be used as objects of interest. If the object is determined to be an object for which a match is sought from a peer site, process 600 proceeds along the "yes" path to 608.

If, however, it is decided to not seek a match for the object process 600 may proceed from 604 along the "no" path to 606 and the process 600 may end. In some implementations, all objects may be submitted for secure matching so the process 600 would not end but rather proceed to 608 for all detected objects.

At 608, a secure match evaluation request is submitted to a peer computing system. The peer computing system may be the computing system 112 of the second site 104.

At 610, the peer computing system receives the secure match evaluation request. The peer computing system at the second site 104 may obtain a feature vector at 612 by techniques similar or identical to those used by the first site 102 at 602. The second site 104 may obtain the feature vector from the current video feed of the video camera 108 or from a database that stores feature vectors from previously observed objects. For example, the peer computing system may compare the incoming requests to objects that appeared within a predetermined time window (e.g., 10 minutes) prior to receiving the request.

At 614 the first site 102 solves its local computation portion of a distance function. The local portion of the distance function is computed within the privacy boundary 118 of the first site 102. In some implementations the local computation portion may comprise transformation of the feature vector obtained at 602 to a lower dimensionality vector. The transformation may be performed by PCA and linear mapping. For example, the first and second intermediate steps shown in Table V are the local computation portion of the BTDC distance function.

At 616, the computing system(s) 112 of the second site 104 perform a similar local computation on the feature vector obtained at 612.

At 618, a joint portion of the distance function is solved by joint computation between the first site 102 and the second site 104. The joint computation portion of the distance function may be constructed as a garbled circuit to prevent either site from obtaining the other site's secure input. The garbled circuit may be an efficient circuit that only contains the Boolean CMP, MIN, and ADD circuits. For example, the garbled circuit may be the circuit shown in FIG. 5.

For each potential match, there may be one process on the client side (e.g., the first site 102) that communicates with a process on the server side (e.g., the second site 104). These two processes may communicate with each other to determine if their respective input feature vectors match. When the server receives a match request from the client, the server may start one process per potential match. Each process can be started with a feature vector that belongs to a different object and uses a different transmission control protocol (TCP) port for communication. Then the server returns to the client the list of ports where each process is listening. Upon receiving this list, the client may start one process for each port. The feature vector that is input to client-side processes is the same, corresponding to the object that triggered the matching process. The client and server read the outputs of these processes to determine if any of the pairwise matches yield a positive result.

This technique may reveal to the client how many (but not which) objects were seen by the server in the matching time window. If this information is sensitive, to hide it, the server may initiate matches against a fixed number of objects. This fixed number may be an upper bound on the number of objects that can be seen in the matching time period. When fewer objects have been seen, the remaining processes can be supplied random feature vectors as input.

Continuing on FIG. 6B, at 620, a distance determined by the joint solving of the distance function at 618 is compared to a threshold distance. The threshold distance may be the threshold $\hat{t}$ discussed above. When the calculated distance is less than the threshold distance, process 600 proceeds along the "yes" path to 622. However, when the calculated distance is greater or equal to the threshold distance, process 600 proceeds along the "no" path to 624.

At 622, the private input generated by the first site 102 at 614 and used for solving the joint portion of the distance function at 618 is categorized as matching the private input similarly generated by the second site 104. The match of the two private inputs indicates that the objects from which the private inputs were originally created are the same object.

At 624, when the distance calculated by the distance function is equal or greater than the threshold, the private inputs are interpreted as being different and both sites learn that the objects do not match without sharing any distinguishing information about their respective video feeds.

EXAMPLES

The four distance metric learning techniques discussed above PRDC, PRDC without absolute values, MCC, and BTDC are compared using four datasets. Each dataset consists of the snapshots of several different objects and each object has two images captured by different cameras. Thus, the datasets provide still images corresponding to individual frames captured by a video camera.

Two of the datasets are public datasets, Viewpoint Invariant Pedestrian Recognition (VIPeR) and Imagery Library for Intelligent Detection Systems (iLIDS). VIPeR is a large publically available person re-identification dataset. It consists of the well-cropped snapshot images of 632 people taken outdoors. For each person, two images are captured under different viewing angles and lighting conditions which make the appearance vary and increase the difficulty of the re-identification. The iLIDS dataset is extracted from a multiple-camera tracking video scenario captured in an airport area.

Two private datasets are also used. The private datasets were created by collecting multiple video clips from two video cameras pointing at two different adjacent streets. Multiple video clips were collected from each camera at different times of day for a total of 207 minutes of video. Because the cameras are at different locations, the size and perspective of the objects they capture is different. Images of 114 people from 100 minutes of the video were extracted to create a human dataset. A car dataset was created by extracting images of 83 cars from 40 minutes of video clips.

In order to reduce the impact by errors in object localization, snapshots from the human dataset or the car dataset were manually cropped around the objects. The public datasets, VIPer and iLIDS, provide cropped objects. An input feature vector is extracted from images of humans in the dataset by using color histogram as the input feature. Color histogram is resilient against the scale of the object. For images of cars, multiple stripes are extracted based on the principal axis of the car using color histogram. By extracting multiple stripes the feature representation of the car is rotation invariant.

Before testing the four different techniques, training set size and quantization levels were determined experimentally. The size of the training set affects matching accuracy. A larger training set generally leads to higher matching accuracy. Accuracy is evaluated with Receiver Operational Characteristic (ROC) curves. A ROC curve is commonly used for binary classification evaluation. The true positive rate (TPR) is presented along the vertical axis and the false positive rate (FPR) is presented along the horizontal axis. Changes in the shape of a ROC curve can be investigated for different methods and inputs. The more accurate that a matching method is, the closer the ROC curve will be to the upper-left corner of the graph. The upper-left corner of an ROC graph corresponds to a desirable condition of high TPR and low FPR.

Figure 7:
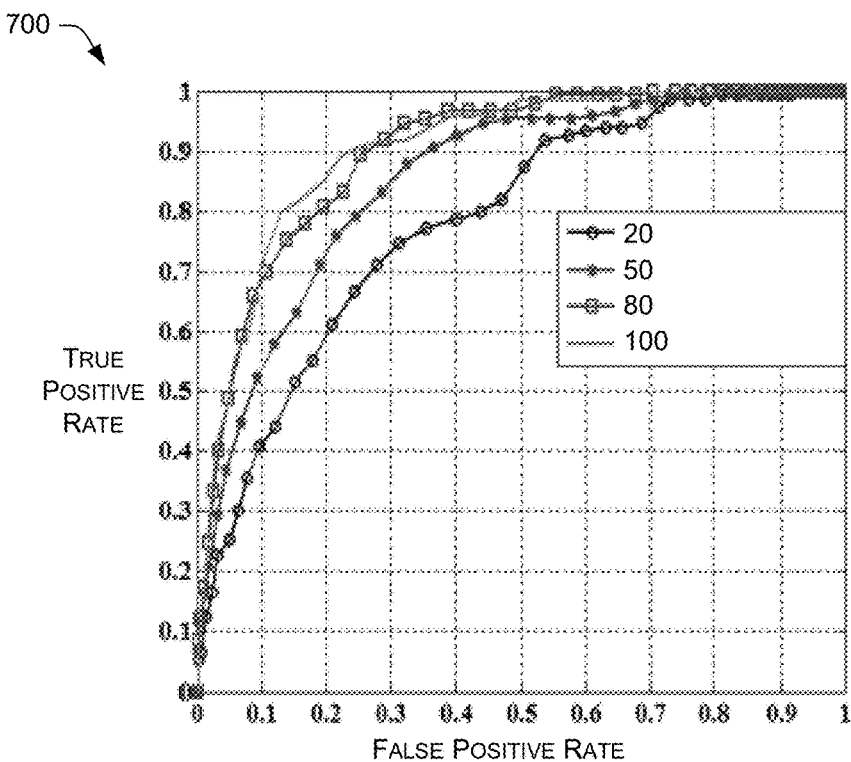
FIG. 7 is a Receiver Operation Characteristic (ROC) curve showing the effect of training set size on accuracy of classifying object from the Viewpoint Invariant Pedestrian Recognition (VIPeR) database.

FIG. 7 shows ROC curves generated by different training set sizes. Comparison was performed on images from the VIPeR dataset. The training set sizes tested are 20, 50, 80, and 100 objects. Accuracy increases as the training set size increases from 20 to 120. However, the accuracy improves only slightly when the size of training set increases from 80 to 100. Accordingly, 80 randomly selected objects are used as the training set for experiments performed with the VIPer, iLIDS, and human datasets. The car dataset contains images of only 83 cars so a smaller number of objects, 68, were used for training.

Figure 8:
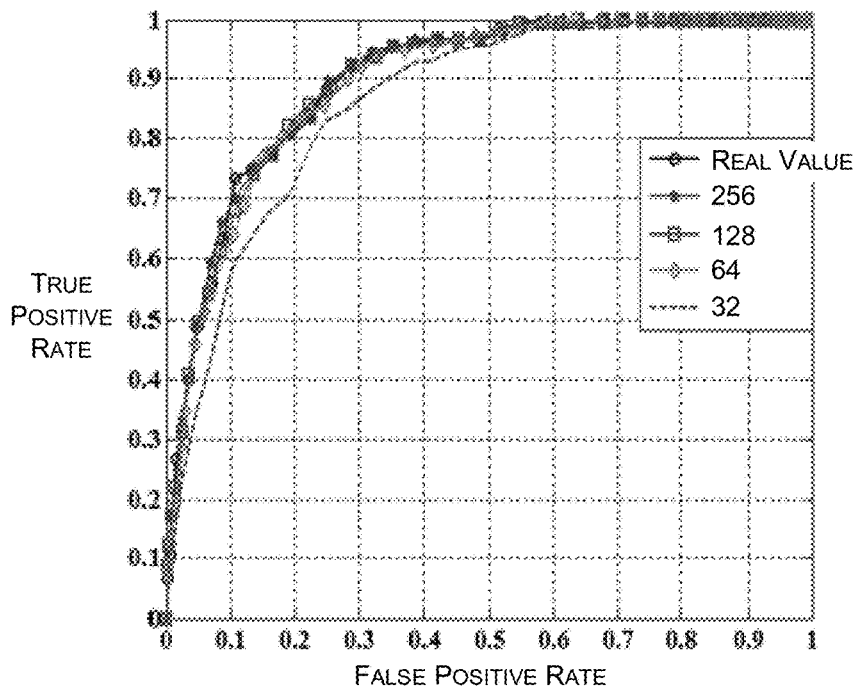
FIG. 8 is a ROC curve showing the effect of quantization level of an input vector on accuracy of classifying an object from the VIPeR database.

FIG. 8 shows ROC curves generated by different quantization levels. As discussed above, an input vector is quantized into one of a finite set of prescribed integer values in order to generate and integer input to a Boolean circuit for secure computation. The larger the quantization level, the smaller the negative impact on accuracy. Different quantization levels were tested on images from the VIPeR dataset. The curve showing "real value" presents results obtained by using original real value of a vector without quantization. Accuracy increases as quantization increases from 32 bits to 256 bits. A quantization level of less than 64 bits results in a loss of accuracy. To minimize the loss of accuracy, 256 (l=8) levels are used in the experiments described below.

Accuracy results were tested for each of the four distance metric learning techniques—PRDC, PRDC without absolute values, MCC, and BTDC—on each of the four datasets. In the testing 15 objects were used as the testing set with 80 objects (68 for the car dataset) used as training objects. The training set and testing set do not overlap, i.e., each object only appears either in training set or testing set. In the training set, a pair of snapshots of each person or car under different views form the positive set $\mathcal{O}^p$, and all pairs of images of different people are the negative set $\mathcal{O}^n$. These sets are used in learning the parameters mentioned in above in the discussion of distance metric learning. The accuracy curves shown for a given distance metric learning technique in FIGS. 9-12 are generated from the average of ten separate trials.

Figure 9:
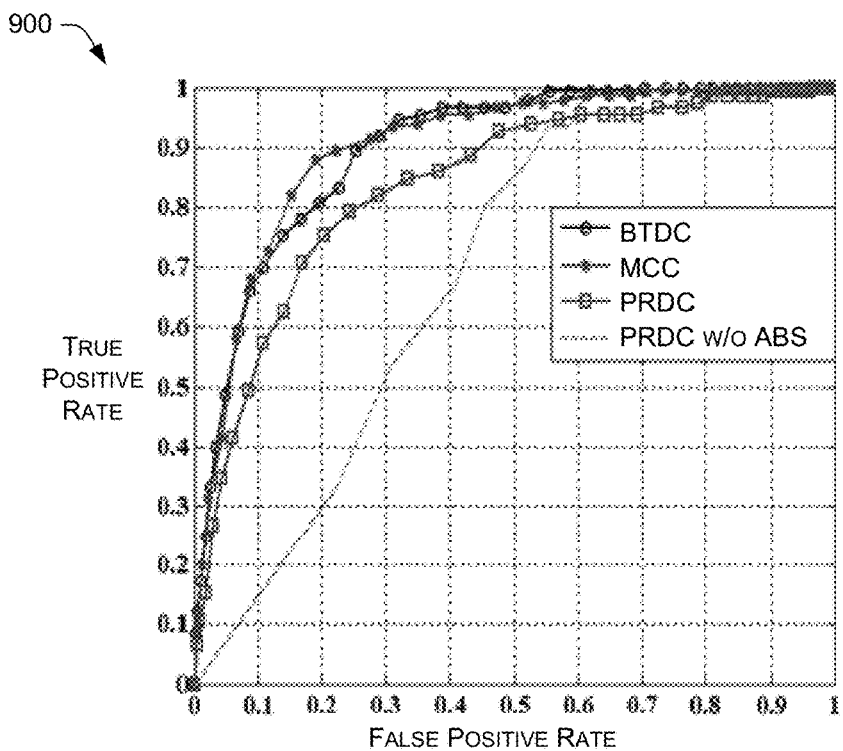
FIG. 9 is a ROC curve showing the relative accuracy of different secure matching functions for objects from the VIPeR database.

FIG. 9 shows the ROC curves under different matching functions when tested against the VIPeR dataset. The PRDC without absolute values distance metric learning technique had significantly lower accuracy than the other three techniques. The BTDC distance metric learning technique derived above, obtains similar performance to MCC while reducing the computational cost.

Figure 10:
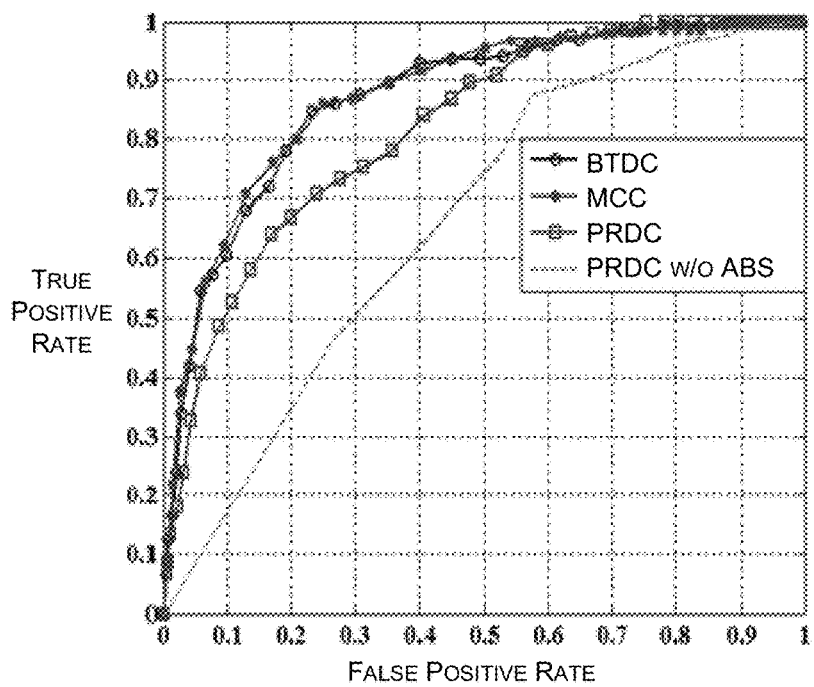
FIG. 10 is a ROC curve showing the relative accuracy of different secure matching functions for objects from the Imagery Library for Intelligent Detection Systems (iLIDS) database.

FIG. 10 shows the ROC curves under different matching functions when tested against the iLIDS dataset. Similar to FIG. 9, the BTDC technique achieves a similar level of accuracy as the MCC technique. The overall performance of all the methods with respect to iLIDS dataset is slightly lower than that for the ViPeR dataset due to the presence of occlusions in front of foreground objects.

Figure 11:
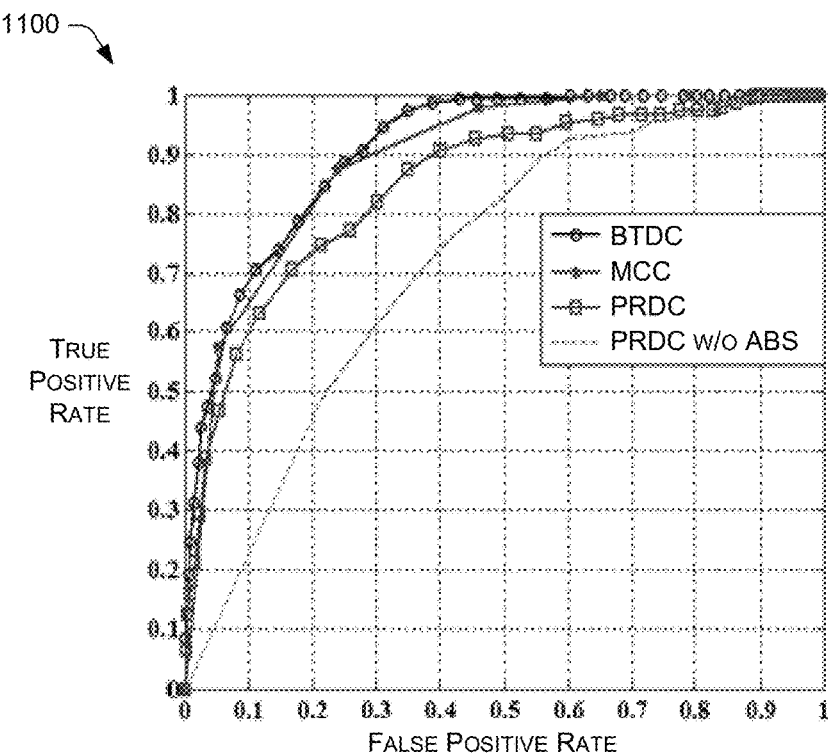
FIG. 11 is a ROC curve showing the relative accuracy of different secure matching functions for objects from the "human database."
Figure 12:
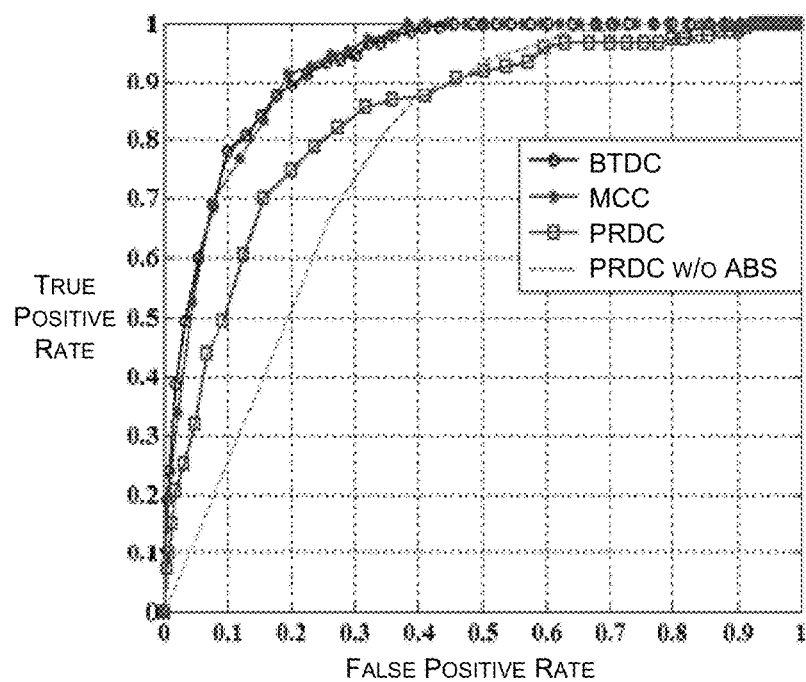
FIG. 12 is a ROC curve showing the relative accuracy of different secure matching functions for objects from the "car database."

FIG. 11 shows the ROC curves under different matching functions when tested against the human dataset. The BTDC technique has accuracy that is comparable to the PRDC and MCC techniques, while the PRDC without absolute values has much lower accuracy. FIG. 12 shows the ROC curves under different matching functions when tested against the car dataset. The results are similar to FIG. 11.

Tables VI-IX below show the relationship between matching accuracy and performance for the four different distance metric learning techniques. The measure of performance of a technique is represented by the number of non-XOR gates calculated using the above equations for determining circuit size. In all cases shown in the following tables, the quantization level is l=8 and d=3456. The other parameters are shown with each table. Area Under an ROC Curve (AUC) is used to represent accuracy characteristics of each method because the closer a given ROC curve is to the up-left corner the more accurate the method was that generated that ROC curve and the larger the AUC. AUC value ranges from 0 to 1.

TABLE VI

ViPER Dataset (L = 3; q = 69)

| technique | non XOR gates | AUC |
|---|---|---|
| PRDC | 1,508,070 | 0.8335 |
| PRDC w/o abs | 435 | 0.6708 |
| MCC | 10,009 | 0.8971 |
| BTDC | 1,729 | 0.8934 |

TABLE VII iLIDS Dataset (L = 3; q = 76)

| technique | non XOR gates | AUC |
|---|---|---|
| PRDC | 1,508,070 | 0.8151 |
| PRDC w/o abs | 435 | 0.6646 |
| MCC | 11,022 | 0.8697 |
| BTDC | 1,902 | 0.8653 |

TABLE VIII

Human Dataset (L = 2 for PRDC, L = 15 for PRDC w/o abs; q = 75)

| technique | non XOR gates | AUC |
|---|---|---|
| PRDC | 1,033,027 | 0.8452 |
| PRDC w/o abs | 2,175 | 0.7244 |
| MCC | 10,878 | 0.9001 |
| BTDC | 1,878 | 0.9042 |

TABLE IX

Car Dataset (L = 2 for PRDC, L = 3 for PRDC w/o abs; q = 53)

| technique | non XOR gates | AUC |
|---|---|---|
| PRDC | 1,033,027 | 0.8336 |
| PRDC w/o abs | 435 | 0.7907 |
| MCC | 7,667 | 0.9207 |
| BTDC | 1,327 | 0.9210 |

The results shown in Tables VI-IX indicate that even though the PRDC without absolute values technique results in the smallest number of non XOR gates, this technique has much lower accuracy than any of the other techniques. The other three techniques PRDC, MCC, and BTDC provide similar accuracy. However, the BTDC technique is much more computationally efficient having average 748 times fewer non XOR gates than PRDC and 6 times fewer non XOR gates than MCC.

Figure 13:
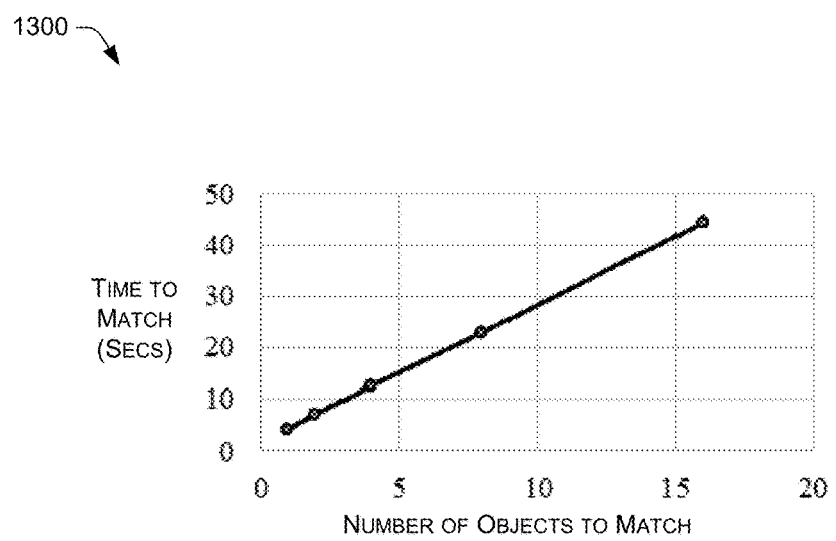
FIG. 13 is a graph showing linear change in the time required to compute a match between objects as a number of objects to match changes.

FIG. 13 shows performance results for secure matching using the BTDC technique. The system used for this test includes two netbooks each with a 1 GHz processor and 2 GB memory that run Windows 8 with a network emulator to create a round-trip network delay of 100 ms between the netbooks.

The total time from the client issuing the match request to it recovering the result of the match in seconds for this test system is shown on the vertical axis of FIG. 13. This time includes the time for initial handshake in which the client learns about the ports on which the server processes are running and the time to start client and server processes. Randomly selected feature vectors are used for matching. Matching performance does not depend on the values in the feature vector; it only depends on the size of the feature vector, which is independent of the objects being matched. In the experiments used to generate FIG. 13 q=128, l=8, and $\hat{t}$=9280. Thus, the number of non XOR gates to the garbled circuit used in the BTDC technique is 3,199. Ten different trials were performed for each number of objects the mean of the trials is plotted in FIG. 13. The time it takes to securely match objects increases linearly with the number of objects that need to be matched. For single-object matches, the time is roughly 4 seconds. For matching 4-16 objects, the total time amounts to roughly 3 seconds per match. Thus, as many as 20 objects may be securely matched in under a minute.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The invention claimed is:

1. A system, comprising:
computer-readable storage media having stored thereon instructions executable to cause the system to perform operations;
one or more hardware processors coupled to the computer-readable storage media and configured to read instructions from the computer-readable storage media media to cause the system to perform operations comprising:
obtaining by a remote server a plurality of images from a first video camera within a first privacy boundary, the plurality of images being provided to the remote server through a first communications network, the first privacy boundary being maintained by a secure configuration of the remote server, wherein the first privacy boundary prevents a user associated with the first privacy boundary from obtaining a plurality of images captured by a second video camera within a second privacy boundary;

detecting, by the remote server, an indication of at least one object in the plurality of video frames from the first video camera;

generating a first feature vector for the at least one object in the plurality of video frames from the first video camera;

receiving a request for a match evaluation for a second object at the remote server from an issuing computing system; and determining if the at least one object in the plurality of video frames from the first video camera matches the second object using a distance function based upon the first feature vector and a second feature vector for the second object.

2. The system of claim 1, wherein the distance function comprises determining a histogram intersection function for the first feature vector and the second feature vector.

3. The system of claim 1, wherein the operations further comprise transforming the first feature vector of the at least one object in the plurality of video frames from the first video camera to a lower dimensionality vector.

4. The system of claim 3, wherein the transformation comprises Principal Component Analysis (PCA) and linear mapping.

5. The system of claim 1, wherein the operations further comprise:
sending, as a part of a joint computing for the distance function, a Boolean circuit of at least a portion of the distance function to a peer computing system; and
waiting for the peer computing system to compute an output to the Boolean circuit.

6. The system of claim 1, wherein the first feature vector and the second feature vector comprise at least one of color histograms or texture histograms.

7. The system of claim 1, wherein the operations further comprise generating an alert if the at least one object in the plurality of video frames from the first video camera is the same as the second object.

8. A computer-implemented method, comprising:
obtaining by a remote server a plurality of images from a first video camera within a first privacy boundary, the plurality of images being provided to the remote server through a first communications network, the first privacy boundary being maintained by a secure configuration of the remote server, wherein the first privacy boundary prevents a user associated with the first privacy boundary from obtaining a plurality of images captured by a second video camera within a second privacy boundary;
detecting, by the remote server, an indication of at least one object in the plurality of video frames from the first video camera;
generating a first feature vector for the at least one object in the plurality of video frames from the first video camera;
receiving a request for a match evaluation for a second object at the remote server from an issuing computing system; and
determining if the at least one object in the plurality of video frames from the first video camera matches the second object using a distance function based upon the first feature vector and a second feature vector for the second object.

9. The computer-implemented method of claim 8, wherein the distance function comprises determining a histogram intersection function for the first feature vector and the second feature vector.

10. The computer-implemented method of claim 8, further comprising transforming the first feature vector of the at least one object in the plurality of video frames from the first video camera to a lower dimensionality vector.

11. The computer-implemented method of claim 10, wherein the transformation comprises Principal Component Analysis (PCA) and linear mapping.

12. The computer-implemented method of claim 8, further comprising:
sending, as a part of a joint computing for the distance function, a Boolean circuit of at least a portion of the distance function to a peer computing system; and
waiting for the peer computing system to compute an output to the Boolean circuit.

13. The computer-implemented method of claim 8, wherein the first feature vector and the second feature vector comprise at least one of color histograms or texture histograms.

14. The computer-implemented method of claim 8, further comprising generating an alert if the at least one object in the plurality of video frames from the first video camera is the same as the second object.

15. A non-transitory machine-readable medium having stored thereon machine-readable instructions executable to cause machine to perform operations comprising:
obtaining by a remote server a plurality of images from a first video camera within a first privacy boundary, the plurality of images being provided to the remote server through a first communications network, the first privacy boundary being maintained by a secure configuration of the remote server, wherein the first privacy boundary prevents a user associated with the first privacy boundary from obtaining a plurality of images captured by a second video camera within a second privacy boundary;
detecting, by the remote server, an indication of at least one object in the plurality of video frames from the first video camera;
generating a first feature vector for the at least one object in the plurality of video frames from the first video camera;
receiving a request for a match evaluation for a second object at the remote server from an issuing computing system; and
determining if the at least one object in the plurality of video frames from the first video camera matches the second object using a distance function based upon the first feature vector and a second feature vector for the second object.

16. The computer-implemented method of claim 15, wherein the distance function comprises determining a histogram intersection function for the first feature vector and the second feature vector.

17. The computer-implemented method of claim 15, further comprising transforming the first feature vector of the at least one object in the plurality of video frames from the first video camera to a lower dimensionality vector.

18. The computer-implemented method of claim 17, wherein the transformation comprises Principal Component Analysis (PCA) and linear mapping.

19. The computer-implemented method of claim 15, further comprising:
sending, as a part of a joint computing for the distance function, a Boolean circuit of at least a portion of the distance function to a peer computing system; and
waiting for the peer computing system to compute an output to the Boolean circuit.

20. The computer-implemented method of claim 8, further comprising generating an alert if the at least one object in the plurality of video frames from the first video camera is the same as the second object.

* * * * *